(No Model.)
J. J. NAREGANG.
BICYCLE.
No. 570,327. Patented Oct. 27, 1896.
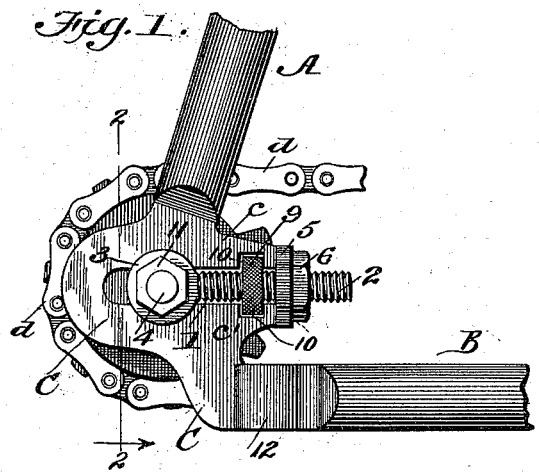
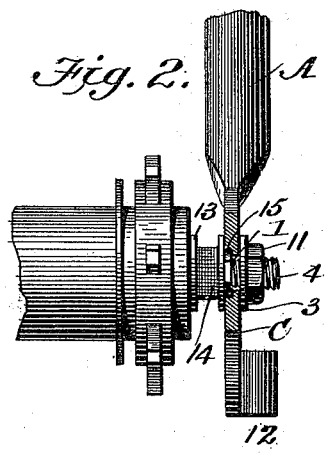
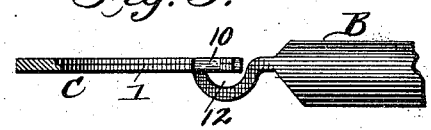
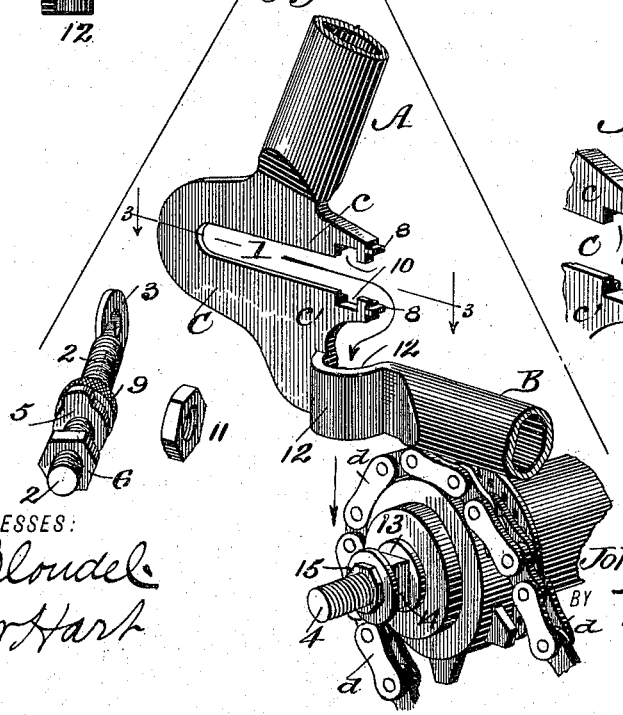
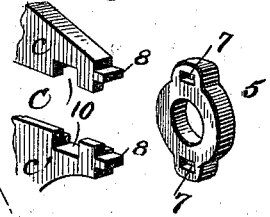
WITNESSES:
U. D. Bloudel
Amos W. Hart
INVENTOR
John J. Naregang
BY
Munn & Co.
ATTORNEYS.

UNITED STATES PATENT OFFICE.

JOHN J. NAREGANG, OF LEESPORT, PENNSYLVANIA.

BICYCLE.

SPECIFICATION forming part of Letters Patent No. 570,327, dated October 27, 1896.

Application filed June 22, 1896. Serial No. 596,495. (No model.)

*To all whom it may concern:*

Be it known that I, JOHN J. NAREGANG, of Leesport, in the county of Berks and State of Pennsylvania, have invented a new and useful Improvement in Bicycles, of which the following is a specification.

My invention is an improvement in the class of "safety-bicycles" which are provided with chain-and-sprocket driving-gear.

The invention pertains chiefly to an improved construction and combination of parts for effecting adjustment of the tension of the driving-chain and for facilitating removal of said chain and also the rear or driving wheel from the frame.

In accompanying drawings, Figure 1 is a side view of the rear portion or fork of a bicycle provided with my invention. Fig. 2 is a horizontal section of the same. Fig. 3 is a horizontal section of the rear fork provided with my improved union or joint-piece. Fig. 4 is a perspective view illustrating the detachment of the rear axle. Fig. 5 is a detail perspective.

The rear forks A and B of the bicycle-frame are connected by a joint-piece or union C. This union C has a central longitudinal slot 1, that opens at the inner end or side of the same at a point between the divergent arms $c$ $c'$ of the union, as shown. In said slot is arranged the chain-adjusting screw 2, the same being placed between and parallel to the edges of the slot, as shown, and provided with a flattened head 3, having an eye to adapt it for attachment, in the usual way, to the axle 4 of the rear or driving wheel (not shown) of the bicycle. Such flattened head 3 of the screw is so arranged as to lie in sliding contact with the outer side of the union C, and the front end of the screw 2 is held in due position by a guide 5, which serves also as a washer for the clamp-nut 6. Such guide-washer 5 has slots 7, Fig. 5, for receiving the reduced ends 8 of the inwardly-projecting prongs that form integral portions of the union C. By this means the washer 5 is held from turning and also from lateral displacement (when the nut 6 is screwed up against it) and is yet adapted to be readily detached when it is desired to remove the screw 2 from the axle 4.

The nut 9, mounted on the screw 2, intermediate of the head 3 and guide-washer 5, and working in opposite notches or open slots 10 in prongs of union C, serves for adjusting the screw 2 in either direction, according as it is desired to move the axle 4 inward or outward for the purpose of regulating the tension of the driving-chain $d$. It will be perceived that to effect such adjustment of the axle 4 in the outward direction, or farther from the pedal and crank-shaft (not shown) for the purpose of tightening the chain $d$, the axle-nut 11 is first loosened, and the clamp-nut 6 is next screwed outward on the screw 2, so that it is out of contact with the guide-washer 5, and the set-nut 9 is then rotated to move the screw 2 longitudinally rearward. When the required adjustment has been thus made, the clamp-nut 6 is screwed back against the washer 5, whereby the screw 2 is securely locked in its new position. To adjust the screw 2 and axle 4 in the opposite direction, that is, toward the crank-axle, the set-nut 9 is rotated, and the nut 6 then screwed back against the washer 5, and the set-nut 9 then rotated again to bring it in contact with the outer sides of the notches or slots 10, as shown in Fig. 1, whereby it is jammed and locked as before and the screw 2 locked in turn. By the means and operation described the desired adjustment of the axle 4 may be easily effected and the same securely locked in place.

To avoid separating or spreading apart of the rear forks of the bicycle-frame, in order to allow removal of the rear wheel and axle, I provide the lower arm $c'$ of the union C, Figs. 3 and 4, with an outward bend or offset 12. Thus, the clamp-nut 6 being screwed outward on the screw 2 and the nut 11 turned off the axle, the screw 2 and its attachments (see Fig. 4) can be removed laterally, when the axle 4, with the wheel-chain and sprocket attachment, may be removed along the slot 1 and down around the end of the lower prong and dropped down through the bend or offset 12, as will be understood. It is obvious that by reversing this operation the parts may be restored to their original normal position. Thus, by constructing the union C as above described, I provide for removal of the rear wheel without previous detachment of the driving-chain.

The outer cone 13, Figs. 2 and 4, requires adjustment to compensate for wear, and to enable this to be expeditiously done I provide its grooved portion with flat parallel sides 14 to adapt it for application of a wrench. The cone 13 is held from turning by engagement of two opposite sides of its octagonal projection or hub 15 with the sides of the slot 1. This octagonal portion 15 enables the cone 13 to be rotated one-eighth of a revolution and reset or locked as before, which is ordinarily sufficient.

Having thus described my invention, what I claim, and desire to secure by Letters Patent, is—

1. The combination, with the rear-wheel axle, and the frame union or joint-piece having a lengthwise slot, of the axle-adjusting screw, the adjusting-nut applied to the latter and engaging the union as specified, the guide-washer for said screw and a clamp-nut working in contact with the washer, substantially as shown and described.

2. The combination, with the rear-wheel axle and the frame union or joint-piece having a lengthwise slot which opens on the inner side which is nearest the crank-shaft, of the union and between the divergent arms of the latter, of the axle-adjusting screw, and means for adjusting and locking it, the lower arm of said union having a lateral bend or offset, substantially as shown and described.

3. A bicycle-frame whose rear angle-piece or union is provided with a lengthwise slot, and an outward bend or offset located below said slot, for facilitating removal of the wheel-axle, substantially as shown and described.

4. The combination of the removable screw, adjusting-nut, and guide-washer, and clamp-nut with the rear-wheel axle, and the joint-piece or union of a bicycle-frame having a lengthwise slot which opens on the inner side and a lateral bend or offset below said slot, as shown and described.

5. The combination, with the rear union or joint-piece of a bicycle-frame having a lengthwise slot, and the rear-wheel axle, of the cone-bearing having an octagonal hub fitting in said slot, and a circumferentially-grooved portion having parallel plane sections that adapt it for application of a wrench, as and for the purpose specified.

JOHN J. NAREGANG.

Witnesses:
GEO. A. RAHN,
JACOB KERN.